United States Patent
Migone et al.

(10) Patent No.: US 7,217,772 B2
(45) Date of Patent: May 15, 2007

(54) PROCESS FOR PRODUCTION OF PROPYLENE HOMOPOLYMERS

(75) Inventors: Rubén A. Migone, Pittsburgh, PA (US); Sehyun Kim, Murrysville, PA (US)

(73) Assignee: Sunoco, Inc. (R&M), Philadelphia, PA (US)

( * ) Notice: Subject to any disclaimer, the term of this patent is extended or adjusted under 35 U.S.C. 154(b) by 0 days.

(21) Appl. No.: 11/089,955

(22) Filed: Mar. 25, 2005

(65) Prior Publication Data

US 2006/0217501 A1    Sep. 28, 2006

(51) Int. Cl.
*C08F 110/06* (2006.01)
*C08F 4/62* (2006.01)

(52) U.S. Cl. .................... 526/65; 526/70; 526/351; 525/53; 525/240

(58) Field of Classification Search ............... 526/65, 526/351, 70; 525/53, 240
See application file for complete search history.

(56) References Cited

U.S. PATENT DOCUMENTS

| 6,689,845 B1* | 2/2004 | Govoni et al. ............... 526/65 |
| 2001/0004662 A1* | 6/2001 | Bidell et al. ............... 526/348 |
| 2003/0130444 A1* | 7/2003 | Satou et al. ............... 526/65 |
| 2003/0149196 A1* | 8/2003 | Streeky et al. ............... 526/86 |
| 2005/0032991 A1* | 2/2005 | Chosa et al. ............. 526/125.3 |

FOREIGN PATENT DOCUMENTS

WO    WO 99/20663    4/1999

* cited by examiner

*Primary Examiner*—Roberto Rabago
(74) *Attorney, Agent, or Firm*—Robert A. Koons, Jr.; Matthew P. McWilliams; Drinker Biddle & Reath LLP

(57) ABSTRACT

A process for producing propylene homopolymers comprises producing a homopolymer in a reactor train having a first stage and a second stage, wherein the first stage is normally used for homopolymer production and the second stage is normally used only in the production of copolymer blends, and is left idle during homopolymer production. According to the invention, during the production of propylene homopolymer, the polymerization is carried out sequentially in both the first stage and second stage reactors.

6 Claims, No Drawings

PROCESS FOR PRODUCTION OF PROPYLENE HOMOPOLYMERS

FIELD OF THE INVENTION

The present invention relates generally to the field of the polymerization of olefins. More specifically, the present invention relates to the field of producing propylene homopolymers in a combination of reactors.

BACKGROUND OF THE INVENTION

In a capital intensive field such as the production of polymers, it is imperative that the maximum amount of production be obtained from each piece of capital equipment. Therefore, when polymerization reactor trains for polyolefins are designed and installed, they are designed for the production of multiple products.

In particular, most polypropylene manufacturers produce both propylene homopolymers and copolymers, i.e. random or impact copolymers. An impact copolymer, is an in-situ blend of a propylene homopolymer with a copolymer of propylene and ethylene and/or other alpha-olefins. To produce such blends in-situ a reactor train having at least two stages is used, wherein the propylene homopolymer portion of the blend is produced in the first stage reactors and is then transferred to the second stage reactors where a copolymer of propylene with ethylene and/or other alpha-olefins is produced in the presence of the homopolymer.

Because of the high capital cost of equipment, the same reactor trains used to produce impact copolymers are used to produce propylene homopolymers. In this case, the second stage reactors are left idle and the homopolymer is recovered directly from the first stage reactors. However, keeping the second stage reactors idle during homopolymer production imposes its own cost, as reactor capacity is left unused for a time.

It would therefore be desirable to provide a method whereby historically unused reactor capacity can be brought into use for the production of propylene homopolymers. Such a process would provide a polymer product of uniform properties and quality.

SUMMARY OF THE INVENTION

The present invention is a process for producing a propylene homopolymer. The process comprises, in a first stage comprising at least one liquid or gas phase reactor, polymerizing propylene in the presence of a Zeigler-Natta catalyst to produce a target propylene homopolymer. The target propylene homopolymer is then transferred to a second stage comprising at least one gas phase reactor. In the second stage gas phase reactor the polymerization of propylene is continued in the presence of the target propylene homopolymer to produce additional amounts of the target propylene homopolymer. The first stage polymerization is generally carried out in the presence of a co-catalyst, such as an alkyl aluminum, and an external electron donor. Optionally, additional external donor is also added to the second stage gas phase polymerization.

DETAILED DESCRIPTION OF THE INVENTION

The present invention is a process for producing propylene homopolymers in a two stage polymerization reactor train, wherein traditionally only the first stage of the train is used for producing propylene homopolymers.

In general, in the production of reactor produced blends of propylene homopolymers with a copolymer of propylene and ethylene and/or other alpha-olefins polymerization reactor trains having at least two separate stages are used. In these processes, a propylene homopolymer is produced in the first stage, which comprises at least one liquid phase reactor or gas phase reactor. The product produced in this first stage is then passed to a second stage, which typically comprises one or more gas phase reactors. In the second stage propylene is polymerized with ethylene and/or other alpha-olefins to form a copolymer in the presence of the propylene homopolymer produced in the first stage, thus producing a blend of the two materials.

In order to make the most cost efficient use of capital equipment, reactor trains are designed so that they can be used both for producing homopolymers, as well as copolymer blends. In such a case, when a homopolymer is in production only the first stage reactor(s) are used and the second stage reactors are left idle. Such a process scheme has generally been taken for granted as the second stage gas phase reactors have been considered unviable for the polymerization of homopolymer in such a configuration.

It has now been found by the inventors that it is possible when producing propylene homopolymers in such a two stage reactor train, to extend the homopolymerization reaction from the first stage gas or liquid phase reactors to the second stage gas phase reactors, which are generally left idle.

The term liquid phase reactor as used herein is intended to encompass both the slurry process and liquid propylene process as described by Ser van der Ven in "Polypropylene and Other Polyolefins", © 1990, Elsevier Science Publishing Company, Inc., pp. 119–125. Both the slurry process and the liquid propylene process are described as operating with a suspension of growing polymer particles in a liquid. In the case of the slurry process, the liquid is an inert solvent. In the case of the liquid propylene process it is liquid monomer.

According to the current invention, a target propylene homopolymer is produced in a polymerization reactor train comprising a first stage having at least one liquid phase or gas phase reactor, and a second stage having at least one gas phase reactor. In most polymerizations using Ziegler-Natta (ZN) type catalysts, the first stage propylene polymerization includes the addition of a co-catalyst comprising a metal alkyl, such as triethylaluminum, and an external electron donor to enhance and/or modify the activity and iso-specificity of the catalyst and thus modify the properties of the propylene homopolymer produced in the first stage.

The target polypropylene powder produced in the first stage is passed to the second stage gas phase reactors where the polymerization is continued in the presence of the first stage product to form additional target polypropylene.

The process according to the current invention is accomplished without the addition of additional ZN catalyst to the second stage gas phase reactors. Rather, the process makes use of active sites remaining on the polypropylene powder produced in the first stage. In this way, additional life can be obtained from a given amount of catalyst and a polymer powder with lower ash can be produced. However, optionally, additional external donor is added to the second stage homopolymerization, preferably in an amount from about 10 percent to about 200 percent of the amount of external donor added to the first stage on a molar basis. The external donor added to the second stage may be the same as or different from the external donor added to the first stage. Exemplary external donors that are useful in the present invention include the non-limiting examples, cyclohexylmethyldimethoxysilane, dicyclopentyldimethoxysilane, diisopropyldimethoxysilane, di-t-butyldimethoxysilane, cyclohexylisopropyldimethoxysilane, n-butylmethyldimethoxysilane, tetraethoxysilane, 3,3,3-trifluoropropylmethyldimethoxysilane and mono and di-alkylaminotrialkoxysilanes. A preferred class of external donors is mono and di-alkylaminotrialkoxysilanes, particularly diethylaminotriethoxysilane. The external donor may be added to the second stage polymerization in any manner as long as one can wet the polymer powders with the external donor. Exemplary methods for injecting the external donor include; through a monomer feed stream to the polymerization, by spraying into the incoming powder, and/or any reactor port.

By extending the production of a homopolymer into second stage gas phase reactors, which are generally left idle for homopolymer production, several benefits can be realized. First, reactor productivity in the production of propylene homopolymer can be increased by utilizing reactor capacity that is normally left idle. Second, catalyst utilization can be improved as active sites on polymer particles can continue to produce polymer in the second stage gas phase reactors. Third, the increased catalyst utilization realized by extending the polymerization results in lower ash content in the polymer produced. Finally, propylene homopolymers having an extremely broad molecular weight distribution (MWD), up to 20, defined as Mw/Mn, can be produced.

EXAMPLE 1

Samples of propylene homopolymer were produced using a polymerization reactor train having two first stage liquid phase loop reactors and two second stage gas phase reactors. Two runs were prepared. Samples of each were taken from material produced using only the first stage liquid phase loop reactors and materials that were produced using the second stage gas phase reactors. The thermal and molecular characteristics of homopolymers produced in the loop and the gas phase reactors are given in Table I. All the characteristics of the polymers were strikingly comparable irrespective of the polymerization in the loop or in the gas phase reactor. It should be noticed that for 12 MFR materials (samples C and D) were produced at different Si/Ti ratio and temperature. Therefore, the samples C and D are not directly comparable. Table I may be summarized as follows.

The melt flow rate (MFR) of polymer produced in the loop only and in the gas phase reactor were comparable to each other, indicating the hydrogen responses of the catalysts in the loop and in the gas phase reactor are comparable. The amounts of xylene soluble slightly decreased when polymerized in the gas phase reactor. It is interesting to note that based on Mz and Mz+1, some amounts of much longer polymer chains were produced when polymerization was extended to the gas phase reactor (samples A and B).

In addition, the isotacticity (% mmmm and Nm) increased slightly when polymerized in the gas phase reactor. Slightly higher crystallinity with comparable melting and recrystalization temperatures was obtained when polymerized in the gas phase reactor. The increased crystallinity may be attributed to the reduced amounts of xylene soluble as well and the increased isotacticity.

TABLE I

Characteristics of homopolymers produced in the loop reactors and gas phase reactor

| Parameter | Unit | A Loop | | B Gas Phase Reactor | | C Loop | | D Gas Phase Reactor | |
|---|---|---|---|---|---|---|---|---|---|
| Si/Ti | ratio | 2.2 | | 2.2 | | 2.6 | | 2.8 | |
| $T_{LRx}$ | ° C. | 70 | | 70 | | 70 | | 75 | |
| $T_{GPRx}$ | ° C. | NA | | 72 | | NA | | 72 | |
| MFR | g/10' | 1.9 | | 1.95 | | 12 | | 10.6 | |
| XS | % wt | 4.4 | | 3.8 | | 3.4 | | 3.1 | |
| | | XIS | XS | XIS | XS | XIS | XS | XIS | XS |
| MWD | | 4.57 | 7.9 | 5.38 | 8.84 | 4.97 | 7.02 | 4.74 | 6.55 |
| Mn | 1000 | 89.6 | 19.5 | 60.3 | 16.7 | 48.4 | 9.9 | 48.1 | 10.2 |
| Mw | 1000 | 409 | 159 | 324 | 148 | 240 | 70 | 228 | 67 |
| Mz | 1000 | 1308 | 603 | 1474 | 657 | 880 | 311 | 677 | 261 |
| Mz + 1 | 1000 | 2733 | 1278 | 3464 | 1472 | 2208 | 770 | 1380 | 569 |
| mmmm | $\%_{mol}$ | 93.01 | 13.32 | 94.38 | 13.63 | 94.53 | 17.22 | 94.57 | 16.41 |
| mmmr | $\%_{mol}$ | 2.42 | 10.34 | 1.82 | 10.28 | 1.78 | 11.06 | 1.94 | 10.84 |
| rmmr | $\%_{mol}$ | 0.0 | 3.68 | 0.0 | 3.62 | 0.0 | 3.44 | 0.0 | 3.98 |
| mmrr | $\%_{mol}$ | 2.05 | 14.26 | 1.82 | 14.13 | 1.7 | 15.1 | 1.77 | 14.78 |
| mmrm or mrrr | $\%_{mol}$ | 0.67 | 14.06 | 0.34 | 13.64 | 0.52 | 11.98 | 0.53 | 12.50 |
| mrmr | $\%_{mol}$ | 0.0 | 3.55 | 0.0 | 3.57 | 0.0 | 3.91 | 0.0 | 3.96 |
| rrrr | $\%_{mol}$ | 0.53 | 20.33 | 0.37 | 21.16 | 0.37 | 18.59 | 0.29 | 17.75 |
| rrrm | $\%_{mol}$ | 0.41 | 13.78 | 0.33 | 13.18 | 0.27 | 11.95 | 0.23 | 12.44 |
| mrrm | $\%_{mol}$ | 0.90 | 6.68 | 0.93 | 6.8 | 0.83 | 6.74 | 0.68 | 7.33 |
| Nm | | 71.2 | 2.7 | 90.1 | 2.8 | 87.8 | 3.0 | 85.3 | 3.0 |
| Nr | | 2.4 | 3.6 | 2.5 | 3.6 | 2.3 | 3.4 | 2.0 | 3.4 |
| $T_m$ | ° C. | 163.7 | | 163.1 | | 162.3 | | 162.6 | |
| $T_c$ | ° C. | 111.5 | | 111.7 | | 112.7 | | 112.8 | |
| Xc (ADSC) | % | 52.7 | | 52.8 | | 54.7 | | 55.9 | |
| Xc (XRD) | % | 56.7 | | 56.7 | | 58.7 | | 59.1 | |

EXAMPLE 2

For this example, some amounts (10% of initial amounts of donor) of cyclohexylmethyldimethoxysilane were injected through the flare line into the second stage gas phase reactor. The addition of donor caused a slight decrease of the level of the gas phase reactor, which is indicative of an increase in catalyst activity. The characteristics and the properties of the polymer produced with and without additional donor are given in Table II. It appears that the additional donor did not affect the characteristics of polymer within the limit of experimental error. The properties of polymers were not affected accordingly.

TABLE II

Characteristics and properties of homopolymer produced with and without additional external donor

| Parameter | Unit | 2400529E | | 2400529F | |
|---|---|---|---|---|---|
| donor | | None | | 10% | |
| MFR | dg/min | 11.3 | | 11.4 | |
| Xylene Solubles | % wt | 2.81 | | 2.89 | |
| | | XIS | XS | XIS | XS |
| MWD | | 4.91 | 6.88 | 4.75 | 6.84 |
| Mn | 1000 | 48 | 10.3 | 48.2 | 10.0 |
| Mw | 1000 | 236 | 71 | 229 | 68 |
| Mz | 1000 | 677 | 300 | 704 | 250 |
| Mz + 1 | 1000 | 1402 | 732 | 1550 | 506 |
| mmmm | $\%_{mol}$ | 94.69 | 15.96 | 94.70 | 16.54 |
| mmmr | $\%_{mol}$ | 1.97 | 11.31 | 1.82 | 11.18 |
| rmmr | $\%_{mol}$ | 0.0 | 3.7 | 0.16 | 4.00 |
| mmrr | $\%_{mol}$ | 1.8 | 14.87 | 1.59 | 14.87 |
| mmrm or rmrr | $\%_{mol}$ | 0.40 | 12.61 | 0.46 | 12.94 |
| mmmr | $\%_{mol}$ | 0.0 | 3.82 | 0.08 | 3.53 |
| rrrr | $\%_{mol}$ | 0.28 | 19.22 | 0.22 | 17.36 |
| rrrm | $\%_{mol}$ | 0.23 | 11.51 | 0.33 | 12.69 |
| mrrm | $\%_{mol}$ | 0.63 | 7.00 | 0.64 | 6.87 |
| Nm | | 88.9 | 3.0 | 91.8 | 3.0 |
| Tc - Major (ADSC) | C | 113.3 | | 112.7 | |
| Tm PP (ADSC) | C | 163.5 | | 162.6 | |
| % Cryst (ADSC) | % | 55.7 | | 55.5 | |
| Crystallinity (XRD) | % | 59.2 | | 57.7 | |
| Flex Modulus | Kpsi | 204.6 ± 1 | | 204.3 ± 1 | |
| Rockwell | R | 98.2 ± .5 | | 98.5 ± .2 | |
| DTUL@66 psi | C | 93.5 ± 3.3 | | 90.6 ± 1.6 | |

The preceding examples demonstrate that it is possible to continue the homopolymerization from the first stage reactors in a two-stage reactor train, and obtain propylene homopolymer of uniform properties and quality from both stages. This permits increased production of polymer for a given amount of catalyst and additionally produces a polymer with a lower ash content.

What is claimed is:

1. A process for producing a propylene homopolymer, comprising:
    in a first stage comprising at least two liquid phase reactors, polymerizing propylene in the presence of a Zeigler-Natta catalyst to produce a target propylene homopolymer,
    transferring the target propylene homopolymer to a second stage comprising at least two gas phase reactors, and
    continuing to polymerize propylene in the presence of the target propylene homopolymer to produce additional amounts of the target propylene homopolymer, wherein a first amount of an external donor is added to the first stage and a second, additional, amount of external donor is added to the second stage.

2. The process according to claim 1, wherein the second amount of external donor is from about 10 percent to about 200 percent of the first amount.

3. The process according to claim 1, wherein the external donor added to the first stage is the same as the external donor added to the second stage.

4. The process according to claim 1, wherein the external donor added to the first stage is different from the external donor added to the second stage.

5. The process according to claim 1, wherein the external donor added to the first stage and the external donor added to the second stage are independently selected from the group consisting of cyclohexylmethyldimethoxysilane, dicyclopentyldimethoxysilane, diisopropyldimethoxysilane, di-t-butyldimethoxysilane, cyclohexylisopropyldimethoxysilane, n-butylmethyldimethoxysilane, tetraethoxysilane, 3,3,3-trifluoropropylmethyldimethoxysilane, and mono and di-alkylaminotrialkoxysilanes.

6. The process according to claim 3, wherein the external donor added to the first and second stage is diethylaminotriethoxysilane.

* * * * *